March 18, 1941.　　　　O. D. COLVIN　　　　2,235,012

DETACHABLE AUTOMOBILE CARRIER RACK

Filed June 29, 1937　　　2 Sheets-Sheet 1

INVENTOR
Oliver D. Colvin
BY
ATTORNEY

March 18, 1941. O. D. COLVIN 2,235,012
DETACHABLE AUTOMOBILE CARRIER RACK
Filed June 29, 1937 2 Sheets-Sheet 2
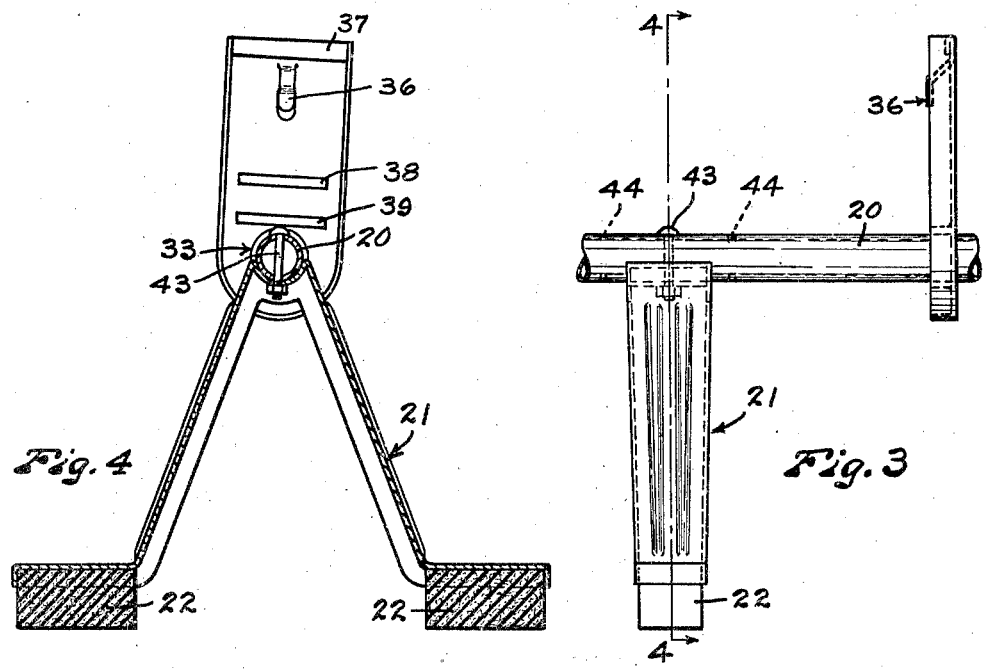
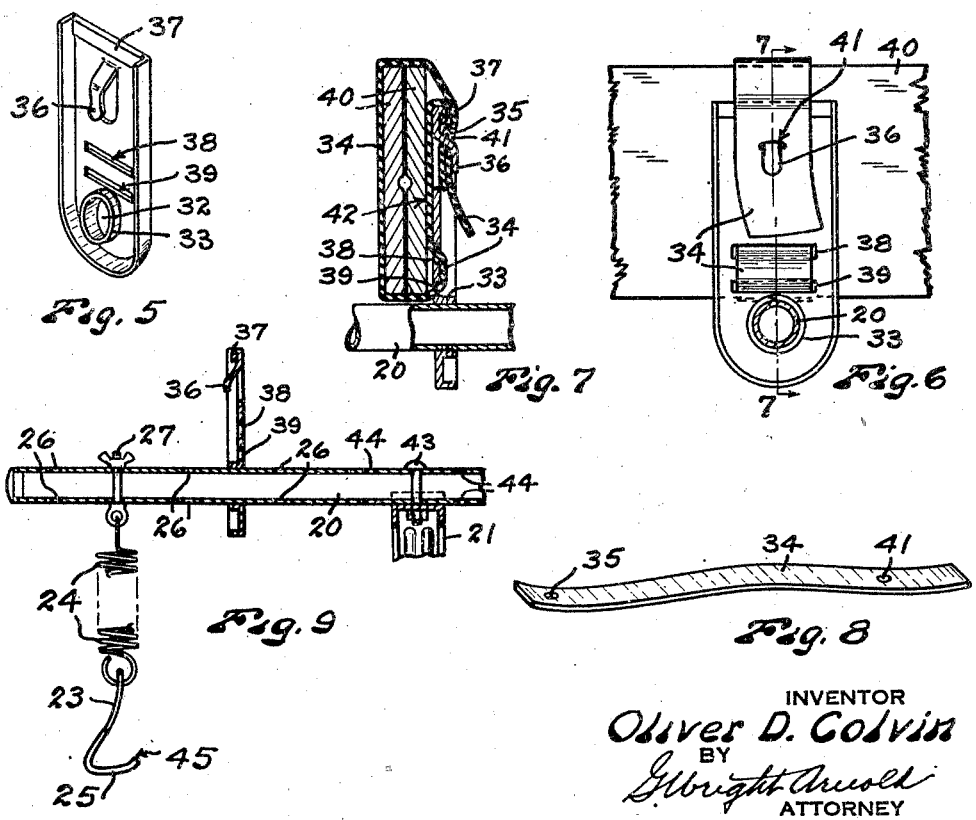
INVENTOR
Oliver D. Colvin
BY
ATTORNEY

UNITED STATES PATENT OFFICE 2,235,012

DETACHABLE AUTOMOBILE CARRIER RACK

Oliver D. Colvin, Seattle, Wash.

Application June 29, 1937, Serial No. 150,952

1 Claim. (Cl. 224—29)

This invention relates to a detachable automobile carrier rack for use on automobiles having a rigidly supported top, such as the top used on a sedan or coupe model.

More particularly, this invention relates to a carrier rack which may be readily, securely and detachably attached relative to the top portion of an automobile or readily and completely detached therefrom when desired. This complete detachment of the carrier rack and all attachment means therefor eliminates all possible objectionable attachments when the automobile is used exclusively as a touring pleasure vehicle.

It is a further object to provide a carrier rack and means for detachably connecting the same to an automobile which will function without requiring any change or permanent attachment whatsoever to the automobile.

It is a further object to provide a detachable rack which is substantially universal as respects its attachment to a variety of automobiles, despite the variations in the length or width thereof.

It is a further object to provide a rack which will not mar, scratch or damage the top of an automobile, either from the rack itself or from the articles carried by the rack.

It is a further object to provide a plurality of frame members which may be transversely positioned relative to the automobile and to which the article or articles to be carried may be attached, so that the articles carried may be utilized as the longitudinal supporting members of the rack.

It is a further object to provide a detachable elastic binding member securing the article or articles to be carried to the rack so that ice, which may be formed on the binder members, may be readily cracked by stretching the elastic member so that the ice will not, therefore, interfere with the attaching or detaching of the binder members.

It is a further object to provide a detachable binder member which may be attached or detached without the usual tying and untying of the binder members.

It is a further object to provide a hook member for attaching a rack relative to the top portion of an automobile, which hook member will engage with the water drain means fabricated into the automobile when the same is built.

It is a further object to engage such water drain means adjacent to the top portion of the automobile and in such a manner as to prevent the hook members, or any rack accessory, or any portion of the rack, or any article carried thereby, from interfering with the opening or closing of any of the doors of the automobile.

It is a further object to provide a rack member which will readily straddle the radio aerial, which is generally used on the top portion of metal top automobiles, and which will neither damage the aerial or interfere with the radio reception.

It is a further object to provide a rack which may be economically constructed, is pleasing in appearance, securely and reliably held in the desired position, strong, light in weight, and durable.

Heretofore many make-shift racks have been constructed to permit articles to be carried on the top portions of automobiles. However, such racks have many defects and the device of this invention substantially differs therefrom, particularly by accomplishing the herein objects of this invention.

In recent years, skiing has become a national pastime, and the art has felt a heretofore unsatisfied demand for a detachable automobile rack for carrying on the top of the automobile skiing paraphernalia, such as skis, poles, etc.

When the car is to be parked and the skiing paraphernalia removed, it is preferable that the rack be also removed. It is desirable to provide means of attachment, both of the articles to the rack and of the rack to the automobile, so that the skiing paraphernalia may be readily, conveniently and rapidly removed. Also the ski rack must be readily removable so that the same may be locked into the automobile, as the extreme ease of detachment of the rack from the automobile would afford undue temptation to theft of the rack. Also the parts forming the ski rack must be of a size which will permit the parts to be conveniently disposed in the automobile when the rack is not in use.

It is of primary importance that the rack be readily, rapidly and easily detached or installed, and that the skiing equipment be likewise readily, rapidly and easily detached therefrom or attached thereto, because of the circumstances under which the skiing paraphernalia is often detached from or attached to the rack before or after skiing. When the parties are ready to leave the automobile and to remove the skiing equipment and rack to start their skiing, their personal physical comfort and eagerness to start skiing requires that the skiing equipment and rack be readily, speedily and conveniently removed. The difference in temperature generally prevailing between that inside and outside of the automobile requires such convenient detachability to prevent the parties from becoming chilled before engaging in the physical activity of skiing. Also after skiing, the parties are generally wet and physically uncomfortable. At such a time the parties are not in a mood to spend the time or effort in attaching a device which requires any painstaking efforts or any considerable length of time during which the parties may become chilled. At such a time the speed and ease of attachment of the rack to the automobile and of the skiing paraphernalia to the rack has a value which is difficult to adequately measure in monetary terms.

The above mentioned general objects of my invention, together with others inherent in the same, are attained by the device illustrated in the following drawings, the same being preferred exemplary forms of embodiment of my invention, throughout which drawings like reference numerals indicate like parts:

Fig. 3 is a view in elevation, on a larger scale than Figs. 1 and 2, and with parts broken away, showing a portion of one of the frame members and the supporting means therefor;

Fig. 4 is a view partly in section and partly in elevation, taken substantially on broken line 4—4 of Fig. 3;

Fig. 5 is a detached perspective view of the article holding means of the rack;

Fig. 6 is a view in elevation, with parts broken away, showing portions of a pair of skis held in place against the article holding means of Fig. 5, and further showing the elastic binding means in operative position;

Fig. 7 is a view partly in elevation and partly in section and with parts broken away, taken substantially on broken line 7—7 of Fig. 6;

Fig. 8 is a perspective view of an elastic binding means which may be used in this invention;

Fig. 9 is a view partly in elevation and partly in section, with parts broken away, showing on a larger scale a portion of the frame member and connecting means illustrated in Fig. 2;

In describing this invention and an application thereof, I will refer to its use in connection with the carrying of skis, but it is to be understood that the invention is not to be limited to any such specific application, but may be used for the carrying of any desirable objects with little or no modifications.

Figure 1:
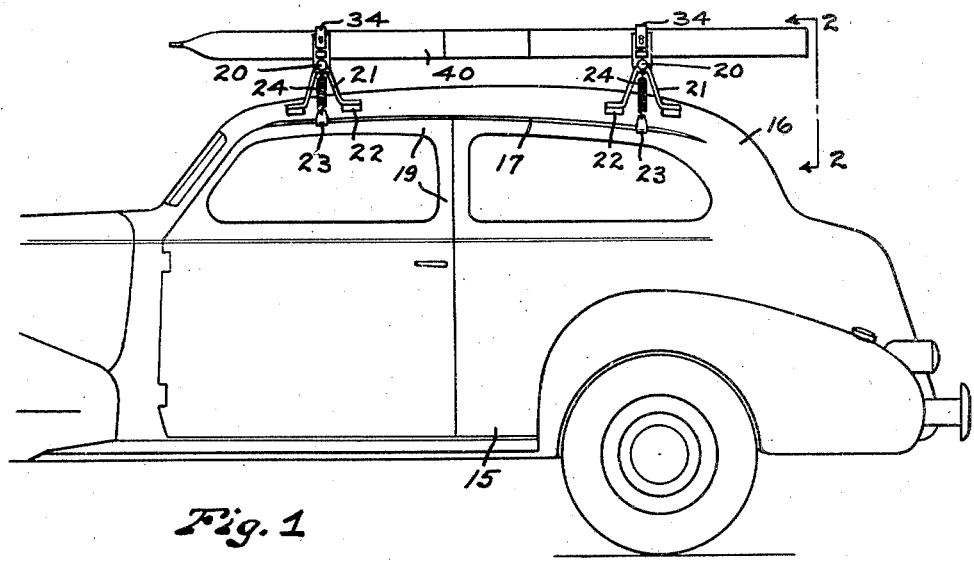
Figure 1 is a side view, with parts broken away, illustrating an automobile with the rack of this invention attached thereto, and showing two pairs of skis supported in such rack.
Figure 2:
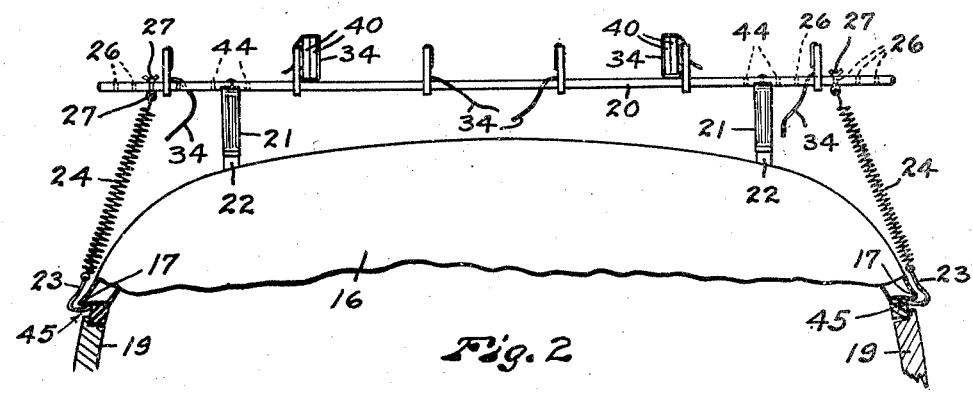
Fig. 2 is a view with parts broken away, partly in section and partly in elevation, taken substantially on broken line 2—2 of Figure 1.

Referring to Figs. 1 and 2 of the drawings, the automobile 15 has the usual top portion 16. The top portion 16 is provided with the usual water drain means, such as the water drain means 17 shown in Figs. 1 and 2, or the water drain means 18 shown in Fig. 11. The water drain means shown are only illustrative of the water drain means generally employed and obviously this invention is applicable to other types of water drain means which may be fabricated into the automobile. Doors 19 of the automobile are generally in relatively close proximity below the water drain means 17 or 18.

Frame members 20 are positioned transversely of the automobile and in longitudinally spaced apart relation. Each frame member 20 is positioned in spaced relation above the top portion 16 of the automobile by means of upright frame supporting members 21. The frame supporting members 21 are preferably, for purposes of strength and stability and economy, of an inverted V shape, with the closed ends of the V connected to the frame members 20 and the open ends of the V adapted to rest on the top portion 16 of the automobile. Preferably relatively thick cushion members 22, such as sponge rubber members, are disposed between the lower ends of the frame supporting members 21 and the top portion 16 of the automobile.

Referring to Fig. 2 of the drawings, the cushion members 22 will serve to conform to the contour of the top portion 16 and also serve as padding means, preventing the marring or scraping of the top portion 16, and further serve to prevent the transmission of any noise, which may develop on the ski rack, to the interior of the automobile 15. The frame supporting members 21 may be secured to the frame members 20 by any usual means, such as the nut and bolt means 43 illustrated in Fig. 3. A plurality of openings 44 are provided through frame members 20 so that the spacing apart of upright frame members 21 may be made in accordance with the width of the automobile. The frame members 20 may be annular in cross section to provide a minimum weight and a maximum strength.

The frame members 20 and frame supporting members 21 are attached to the water drain means 17 or 18 by means of a hook 23 and a resilient member 24, which may be in the form of the spring shown. Referring to Fig. 9, the hook 23 is formed of a hook portion covered with a padded engaging portion 25, such as rubber. This padded engaging portion 25 may be formed by coating the hook portion with rubber. The padded engaging portion 25 engages with the water drain portion 17 or 18 at substantially its tip portion 45, affording thereby substantially a line contact closely adjacent the connection of the water drain means and the automobile body. This will prevent undue strain on the water drain means. The bottom portion of the hook then extends substantially in a horizontal direction.

Figure 11:
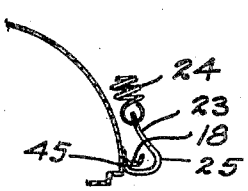
Fig. 11 is a view partly in section and partly in elevation, showing the hook member and a portion of a resilient member attached to a fragment of an automobile, having a different type of water drain means than that shown in Fig. 2.

Referring to Figs. 2 and 11 of the drawings, the substantially horizontal portion of the hook which is padded will not interfere with the opening or closing of doors 19 of the automobile. The horizontal portion of the hook is preferably sufficiently long so that the resilient member 24 (see Fig. 2) will be sufficiently removed from the top portion 16 of the automobile to prevent contact of the resilient member 24 and the top portion 16 of the automobile. In Fig. 2 of the drawings a plurality of openings 26 are provided in the frame members 20. Detachable eyes 27 may be secured to the frame members 20 through the openings 26. In this manner a connection between the resilient members 24 and the frame members 20 may be had, despite the width of a particular automobile, and so that the resilient connecting members 24 extend upwardly and inwardly relative to each side portion of the automobile. In other words, the line of pull of the resilient members 24 is such that the connection of the same to the frame members 20 is inwardly of the point of contact between the hook 23 and the water drain means 17 or 18 and so positioned relative to the water drain means 17 or 18 to prevent release of the hook member 23.

Figure 10:
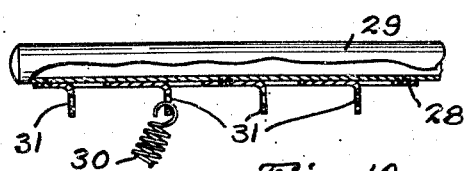
Fig. 10 is a view similar to Fig. 9, except with further portions broken away, illustrating a modified form of the invention.

Instead of using the openings 26 and detachable eyes 27, as illustrated in Figs. 2 and 9, a strip 28 (see Fig. 10) may be secured to the frame member 29, which frame member is interchangeable with the frame member 20. A resilient member 30, which is interchangeable with resilient member 24, connects between eye members 31, which replace the openings 26 and detachable eyes 27. Such a construction as shown in Fig. 10 of the drawings permits the strip 28 to be formed by a stamping process with a plurality of eye members 31 projecting downwardly, and then the strip member 28 may be secured to the frame member 29, as by spot welding, thus providing a rigid and economical construction. The resilient member 30 will connect with the proper eye member 31, depending upon the width of the car to which the rack is attached. Hook members 23 will be disposed on the lower end of the resilient members 30 and connect with the water drain means 17 or 18 of the car, such as illustrated in Figs. 1, 2 or 11.

A plurality of article supporting means, which are preferably formed by the article holding means illustrated in Fig. 5, and the elastic binding means shown in Fig. 8 are laterally spaced apart on said frame members 20. The article supporting means shown in Fig. 5 comprises an opening 32 to receive therein a frame member 20. A shoulder 33 surrounding the opening 32 is secured to the frame member 20 by any suitable means, such as by welding. The article supporting means shown in Fig. 5 is preferably somewhat angularly positioned in its connection with frame members 20 and disposed, when in use, in substantially a vertical plane through the axis of frame member 20, which position will permit articles to be carried substantially at right angles to and adjacent a face of the article supporting means despite the longitudinal curvature of the top portion 16 of the automobile. The elastic binding means 34 shown in Fig. 8 is connected with the article supporting means shown in Fig. 5 as follows: An opening 35 in the elastic binding element 34 is placed over the projecting portion 36. Then the elastic binding element 34 is threaded over the top portion 37, thence downwardly and through opening 38 to the same side of the article engaging means as the projecting member 36, thence downwardly and through the opening 39, around the articles to be held in position, such as skis 40, and thence over the article engaging means with the opening 41 engaging with the projection 36. In this way a layer 42 of the elastic binding means 34 is positioned between the skis 40 and the article engaging means. Also the elastic binding means 34 may be loose, such as indicated in Fig. 2 of the drawings, the skis placed alongside of the article engaging means and the elastic binding means wrapped therearound, and the opening 41 readily inserted in place over the projection 36. In this way the skis 40, or other article so carried, are cushioned from the carrier rack and only contact the elastic binding means 34, thus preventing transmission of noise to the interior of the automobile or damage to the skis or articles carried.

Whenever freezing weather is encountered and ice forms on the elastic binding elements 34, such ice is readily broken, so as not to interfere with the engagement or disengagement of the elastic binding elements 34 with the projections 36, by merely stretching of the elastic binding element 34.

In the drawings I have illustrated two frame members 20 with skis 40 attached therebetween. I do not wish to limit myself to a pair of frame members 20 or to skis as the articles being carried. However, where articles such as skis or the like are carried, I have found that two spaced apart frame members 20 will be sufficient for the service required.

It is important to note that I utilize the skis or articles to be carried as a longitudinal supporting member for the ski rack. The rack may be formed from a relatively few parts which are light in weight and are convenient to handle.

Summarizing the mode of operation of my invention, the frame members 20 and the supporting means 21 therefor, together with the article engaging means may be readily, securely and detachably attached relative to the top portion of an automobile by merely releasing the hook 23 from the water drain means 17 or 18. By moving the upper portion of resilient member 24 inwardly or outwardly and attaching the same to the proper detachable eye 27 or the proper eye member 31 and by attaching the upright members 21 to the frame members 20 by positioning the nut and bolt means 43 through the proper openings 44, the device may be attached to a variety of automobiles, despite the variations in the widths thereof. Any variation in the lengths of the tops of the automobiles will not cause any problem, as a plurality of members 20 are provided. Also the relatively thick cushion members 22 will conform to the curvature of the automobile top, despite variations in curvature.

The only portions of the rack attaching means or articles carried which contact the automobile are the cushion members 22 and the padded tip portions 45 of the hooks 23, and therefore scratching, marring or damage to the top or the automobile is eliminated.

Furthermore, the hook member is shaped so that it may be used regardless of whether the water drain means takes one standard form or another. Also, in the event that a radio aerial is positioned on the top portion of the car, the rack member will readily straddle the same and prevent damage to the aerial and will not interfere with the radio reception.

The rack member may be readily positioned in such spaced relation to the top portion 16 by providing the desired height to the members 21 to thereby prevent any overhanging portions of the articles carried from contacting the top portion 16 and causing damage thereby.

Furthermore, articles are carried in a position not only where they will not damage the automobile or interfere with the free operation of all the doors of the automobile, but so they will not in any way interfere with the vision of the operator and so they will not be damaged by minor accidents.

Obviously, changes may be made in the forms, dimensions and arrangement of the parts of my invention, without departing from the principle thereof, the above setting forth only preferred forms of embodiment.

I claim:

A ski carrier adapted to be applied to the top of an automobile or the like, comprising a cross bar, an upstanding plate fixed to said cross bar, said plate having an upper and a lower opening in the body thereof and a tongue struck up in the upper part thereof, said plate having on one side a flat face, and an elastic binding strap adapted to hold a ski in edgewise position beside the flat side of the plate, said strap extending from the tongue over the upper end of said plate and thence downwardly between the ski and the plate and through said openings and thence under the ski and upwardly around the ski and across the top thereof to engagement with the tongue, the strap having holes at its ends in which the tongue is engaged to hold the strap in binding position.

OLIVER D. COLVIN.